(12) United States Patent
Paik et al.

(10) Patent No.: US 12,095,911 B2
(45) Date of Patent: Sep. 17, 2024

(54) ELECTRONIC DEVICE TO ENHANCE RANDOMNESS OF SECURITY MODULE USING MULTIPLE HARDWARE RANDOM NUMBER GENERATOR AND THE METHOD THEREOF

(71) Applicant: Samsung Electronics Co., Ltd., Gyeonggi-do (KR)

(72) Inventors: Jungha Paik, Gyeonggi-do (KR); Bumhan Kim, Gyeonggi-do (KR); Jeongil Kim, Gyeonggi-do (KR); Jonghyun Ahn, Gyeonggi-do (KR); Jaeyoon Lee, Gyeonggi-do (KR); Hoyong Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 17/689,157

(22) Filed: Mar. 8, 2022

(65) Prior Publication Data

US 2022/0329420 A1 Oct. 13, 2022

Related U.S. Application Data

(63) Continuation of application No. PCT/KR2022/002997, filed on Mar. 3, 2022.

(30) Foreign Application Priority Data

Apr. 7, 2021 (KR) .................. 10-2021-0045485
Jun. 18, 2021 (KR) .................. 10-2021-0079527

(51) Int. Cl.
*H04L 9/08* (2006.01)
*G06F 7/58* (2006.01)

(52) U.S. Cl.
CPC ............ *H04L 9/0869* (2013.01); *G06F 7/588* (2013.01)

(58) Field of Classification Search
CPC ... H04L 9/0869; H04L 9/0861; H04L 9/0877; H04L 9/0891; H04L 9/08; G06F 7/588; G06F 7/58
See application file for complete search history.

(56) References Cited

U.S. PATENT DOCUMENTS 8,130,950 B2 3/2012 Dolgunov et al.
8,560,587 B2 10/2013 Schneider
(Continued)

FOREIGN PATENT DOCUMENTS

JP 6017392 B2 10/2016
KR 10-2016-0050919 A 5/2016
(Continued)

OTHER PUBLICATIONS

International Search Report dated Jun. 14, 2022.

*Primary Examiner* — Quazi Farooqui
(74) *Attorney, Agent, or Firm* — Cha & Reiter, LLC

(57) ABSTRACT

An electronic device according to an embodiment includes a first random number generator module, a second random number generator module, a buffer memory configured to store random number data, and a processor configured to be operatively connected to the first random number generator module, the second random number generator module, and the buffer memory, wherein the processor is configured to acquire a first random number sequence from the first random number generator module to store the acquired first random number sequence in the buffer memory, generate a third random number sequence obtained by changing the first random number sequence based on a second random number sequence acquired from the second random number generator module, and generate an encryption key based on (Continued)

the third random number sequence. In addition, various other embodiments are possible.

14 Claims, 10 Drawing Sheets

(56) References Cited

U.S. PATENT DOCUMENTS

| | | |
|---|---|---|
| 9,058,228 B2 | 6/2015 | Sackett |
| 9,152,380 B2 | 10/2015 | Rose |
| 9,430,192 B2 | 8/2016 | Caron et al. |
| 9,449,193 B2 | 9/2016 | Matsukawa et al. |
| 10,187,200 B1 * | 1/2019 | Firestone ............ H04L 63/0435 |
| 11,392,725 B2 | 7/2022 | Kim et al. |
| 2007/0067374 A1 * | 3/2007 | Iketani .................... G06F 7/588 |
| | | 708/250 |
| 2011/0022916 A1 * | 1/2011 | Desai .................... H04L 9/3239 |
| | | 380/46 |
| 2021/0028935 A1 | 1/2021 | Wu et al. |

FOREIGN PATENT DOCUMENTS

| | | |
|---|---|---|
| KR | 10-1872329 B1 | 6/2018 |
| KR | 10-2020-0089145 A | 7/2020 |

* cited by examiner

ELECTRONIC DEVICE TO ENHANCE RANDOMNESS OF SECURITY MODULE USING MULTIPLE HARDWARE RANDOM NUMBER GENERATOR AND THE METHOD THEREOF

CROSS-REFERENCE TO RELATED APPLICATION(S)

This application is a continuation of International Application No. PCT/KR2022/002997, filed on Mar. 3, 2022, which claims priority to Korean Patent Application No. 10-2021-0045485, filed on Apr. 7, 2021 and Korean Patent Application No. 10-2021-0079527, filed on Jun. 18, 2021 in the Korean Intellectual Property Office, the disclosures of which are herein incorporated by reference.

TECHNICAL FIELD

One or more embodiments of the instant disclosure generally relates to an electronic device and, for example, to an electronic device for improving randomness of its security module by using multiple non-deterministic random number generator modules.

BACKGROUND ART

In line with development of mobile communication technologies and hardware/software technologies, portable electronic devices (hereinafter, referred to as electronic devices) have become capable of implementing various functions in addition to conventional telephone communication functions. One such electronic device may manage data utilized by various applications, may encrypt important data including the user's personal information, and may store the same in a storage device. The electronic device may request user authentication in order to provide various functions. For example, the electronic device may enhance data security by utilizing at least one of a password set by the user, a pattern, and biometric information.

An electronic device may use a random number generator module to generate an encryption key. The electronic device may use a non-deterministic random number generator module and/or a deterministic random number generator module. For example, the electronic device may utilize a random number sequence generated by the deterministic random number generator module for a security element of an application, and may utilize the non-deterministic random number generator module to provide seed information to the deterministic random number generator module.

Conventional electronic devices generate an encryption key by using a deterministic random number generator module (DRNG), and generate seed information for the deterministic random number generator module by using a single non-deterministic random number generator module. However, if the security service depends on the single deterministic random number generator module, there may be problems with security degradation due to unexpected errors (for example, hardware malfunctions, defects).

In addition, measurement of randomness is supposed to follow analysis methods specified in standards such as NIST SP800-90B (recommendation for the entropy sources used for random bit generation), which is a considerably complex procedure, and it is thus difficult to always apply the same during actual use.

SUMMARY

It is an aspect of certain embodiments of the disclosure to provide a method for improving randomness of a terminal without modifying the kernel, which is difficult to maintain/manage, by using multiple non-deterministic random number generator modules to enhance security of the electronic device.

An electronic device according to an embodiment may include a first random number generator module, a second random number generator module, a buffer memory configured to store random number data, and a processor configured to be operatively connected to the first random number generator module, the second random number generator module, and the buffer memory, wherein the processor is configured to acquire a first random number sequence from the first random number generator module to store the acquired first random number sequence in the buffer memory, generate a third random number sequence obtained by changing the first random number sequence based on a second random number sequence acquired from the second random number generator module, and generate an encryption key based on the third random number sequence.

An electronic device according to an embodiment may include a first random number generator module, a second random number generator module, a buffer memory configured to store random number data, and a processor configured to be operatively connected to the first random number generator module, the second random number generator module, and the buffer memory, wherein the processor is configured to acquire a first random number sequence from the first random number generator module to store the acquired first random number sequence in the buffer memory, acquire an entropy count value corresponding to the size of entropy of the random number data stored in the buffer memory, calculate a required amount of random number based on a maximum capacity of the buffer memory and the entropy count value, acquire a second random number sequence from the second random number generator module based on the required amount of random number and store the acquired second random number sequence in the buffer memory, and generate an encryption key using the random number data stored in the buffer memory.

An electronic device according to an embodiment may include a first random number generator module, a second random number generator module, and a processor configured to be operatively connected to the first random number generator module and the second random number generator module, wherein the processor is configured to acquire a first random number sequence from the first random number generator module, acquire a second random number sequence from the second random number generator module, generate a random number mix function for mixing random number sequences, generate a third random number sequence by mixing the first random number sequence and the second random number sequence based on the random number mix function, and generate an encryption key based on the third random number sequence.

According to certain embodiments, an electronic device may improve security performance by using multiple non-deterministic random number generator modules. Other advantageous effects obtainable or predictable from certain embodiments of the electronic device in the case of errors occurred when a single non-deterministic random number generator module is used will be disclosed explicitly or implicitly in detailed description below. For example, advantageous effects of certain embodiments of an electronic device will be disclosed in the following detailed description.

DETAILED DESCRIPTION

Hereinafter, an embodiment of the disclosure will be described in detail with reference to the accompanying drawings.

In describing the embodiments, descriptions of technical contents that are well known in the technical field to which the disclosure pertains and are not directly related to the disclosure will be omitted. In addition, detailed description of components having substantially the same configuration and function will be omitted.

For the same reason, some components are exaggerated, omitted, or schematically illustrated in the accompanying drawings, and the size of each component does not fully reflect the actual size. Accordingly, the disclosure is not limited by the relative size or spacing drawn in the accompanying drawings.

Figure 1:
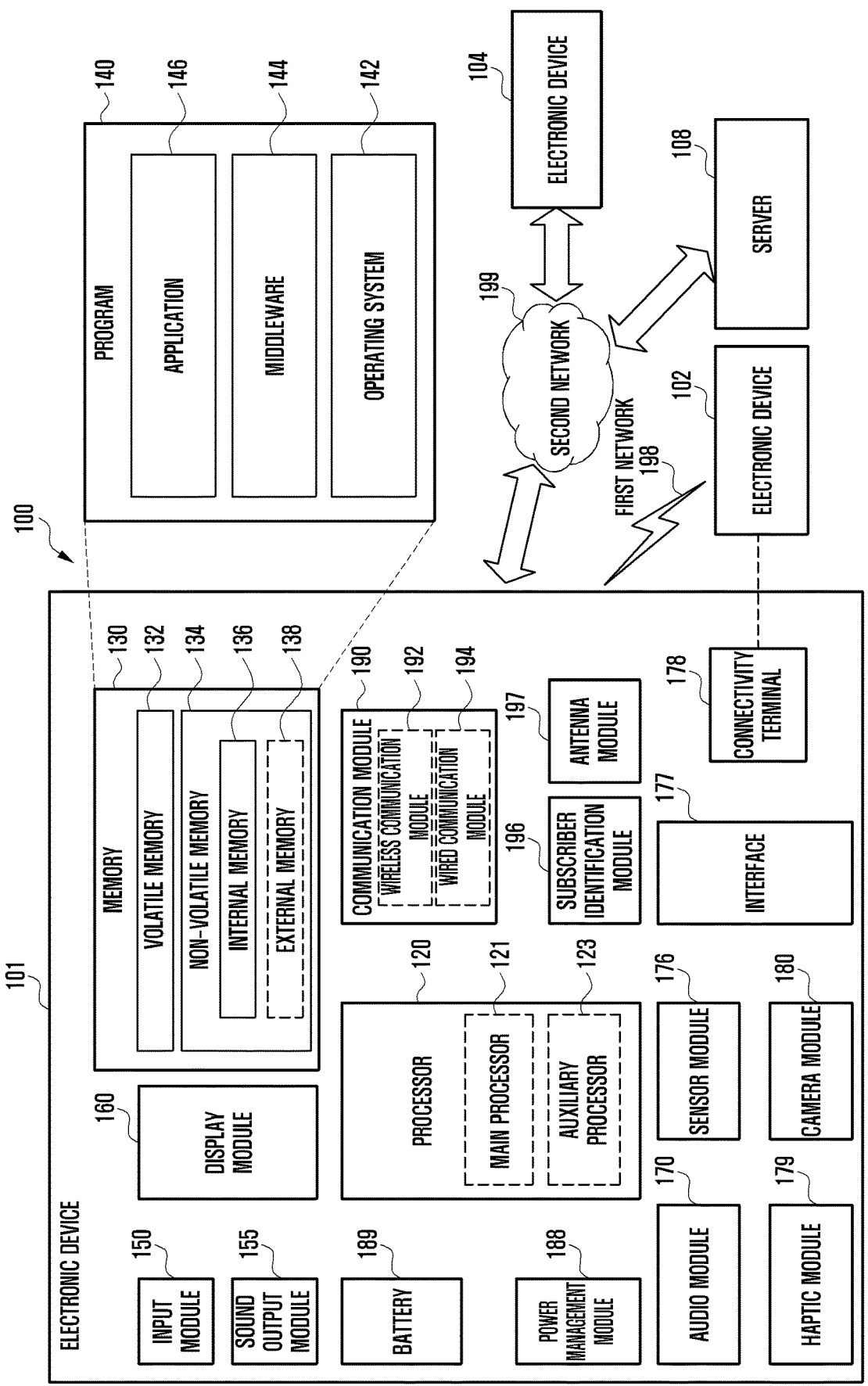
FIG. 1 is a block diagram illustrating an electronic device in a network environment according to an embodiment.

FIG. 1 is a block diagram of an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
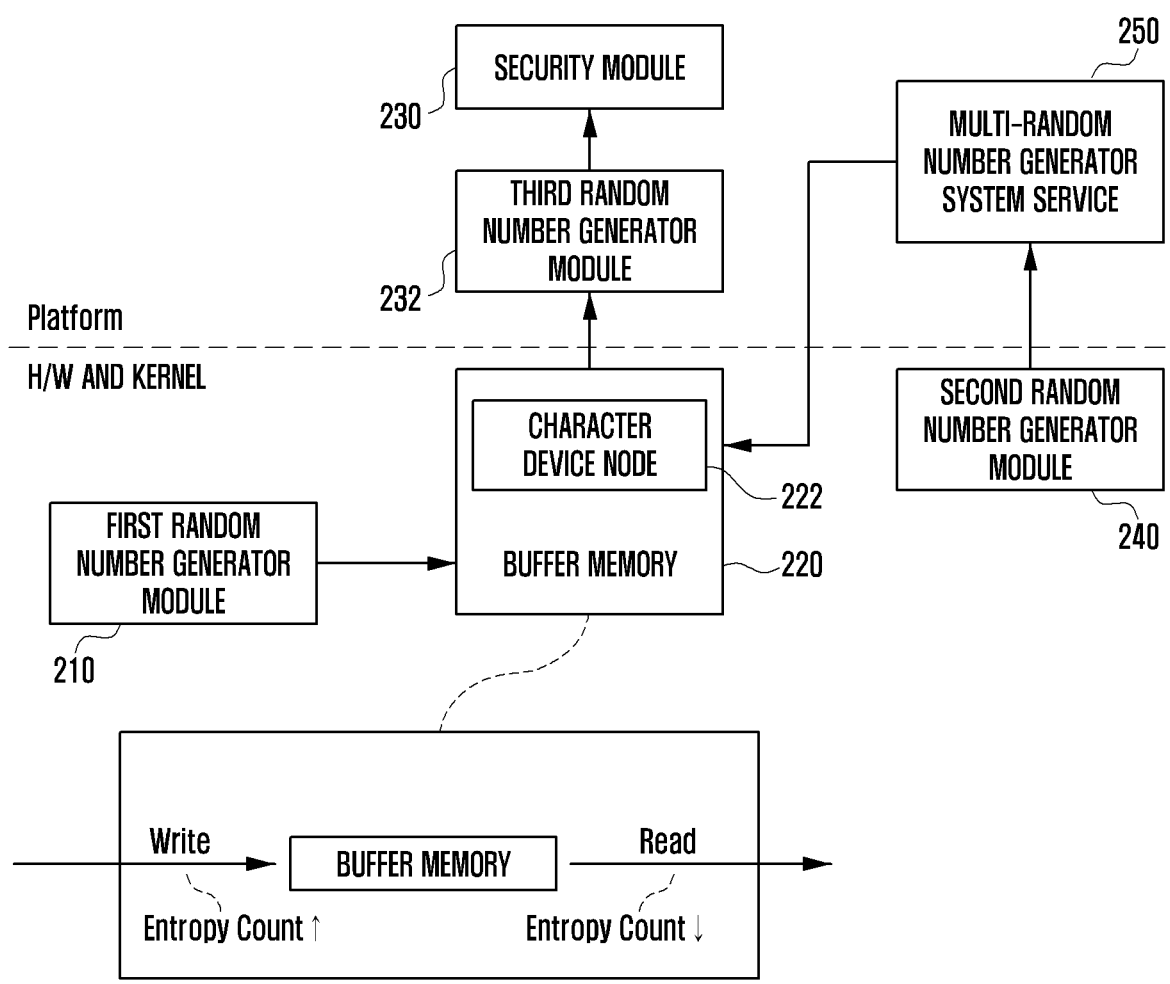
FIG. 2 is a block diagram illustrating a platform and a kernel according to an embodiment.

FIG. 2 is a block diagram illustrating a platform and a kernel according to an embodiment.

According to an embodiment, an electronic device may include a platform and a kernel. The platform is an operating system based on a processor model, and serves as the basis of a computer system, and may include at least one software and components. For example, the platform may include components such as a hardware abstraction layer (HAL), native libraries, runtime environment, one or more frameworks, and one or more applications. The electronic device may execute an application on the platform to provide a predetermined function to the user, and may interact with the user by, for example, accepting a user input.

The kernel (e.g., Linux kernel) may be the intermediary between hardware and the operating system (OS), may be responsible for security of hardware and the processor, may efficiently manage limited system resources, and may provide abstractions, which are sets of common instructions for the same kind of hardware to efficiently manage limited system resources and operate the program smoothly. For example, the kernel may perform the function of providing CPU, memory, and another device as resources for an application executed on the platform.

According to an embodiment, the platform may include a software random number generator (SW-RNG) module 232, which is a deterministic random number generator module, a security module 230, and a multi-hardware random number generator system service module 250. The deterministic random number generator module may generate random numbers by its own algorithm, depending on seed information obtained externally. The kernel may include a first random number generator module 210 and a second random number generator module 240, which are non-deterministic random number generator modules, a buffer memory 220 (buffer memory), and a character device node 222 (e.g., /dev/random, /dev/urandom).

According to an embodiment, the first random number generator module 210 may generate random number data and may input the generated random number data into the buffer memory 220. According to an embodiment, the first random number generator module 210 may be a non-deterministic random number generator module that does not depend on seed information and generates random numbers based on some independent state information. The electronic device may generate random numbers by controlling the first random number generator module 210.

According to an embodiment, the buffer memory 220 may store the random number data of the electronic device. The electronic device may transmit the random number data generated by the first random number generator module 210 to the character device node 222 through the buffer memory 220. The electronic device may determine an entropy count value proportional to the size of the random number data based on the random number data stored in the buffer memory 220. For example, the electronic device may increase the entropy count value when the random number data is input from the random number generator module, and may decrease the entropy count value when the random number data is transmitted to the character device node 222.

According to an embodiment, the character device node 222 may store the random number data obtained from the buffer memory 220 using an ioctl interface. The electronic device may transmit the random number data stored in the character device node 222 to the SW-RNG module 232.

According to an embodiment, the SW-RNG module 232 may use the random number data obtained from the character device node 222 as seed information to generate a security element to be used in an application. The SW-RNG module 232 may generate a random number entirely depending on the given seed information, and may be a software-implemented random number generator in which a cryptographic algorithm is used to generate the random number. Since state information in a computing environment is finite, randomness of the computer environment may be limited and predictable. And in order to improve the randomness of random numbers generated by the electronic device, a non-deterministic random number generator (NDRNG) may be used.

According to an embodiment, the security module 230 may utilize the random number generated by the SW-RNG module 232, for the security element. For example, the security module 230 may generate an encryption key, may generate essential elements of a cryptographic algorithm such as a nonce and an initial vector, and may use the generated essential elements for encryption and secure communication (e.g., secure socket layers {SSL} or transport layer security {TLS}).

According to an embodiment, the second random number generator module 240 may generate random number data for improving the randomness of the random number data stored in the buffer memory 220. Similarly to the first random number generator module 210, the second random number generator module 240 may be a NDRNG module that generates a random number without seed information. The electronic device may use the multi-random number generator system service module 250 to concatenate the random number data generated by the first random number generator module 210 and the second random number generator module 240 so that the concatenated random number data can be used to generate the security element. Since there are two NDRNG modules, even if an error occurs in one of the modules, the randomness of the electronic device may not be deteriorated by using the random number data generated by the other thereof.

According to an embodiment, the multi-random number generation system service module 250 may provide the environment for using the second random number generator module 240. The electronic device may improve the randomness of the random number data acquired by the first random number generator module 210 by utilizing the multi-random number generation system service module 250. For example, the electronic device may change at least a portion of the value of a first random number sequence obtained by the first random number generator module 210 based on a second random number sequence obtained by the second random number generator module 240, or may additionally input the random number data corresponding to the remaining capacity of the buffer memory 220, where the remaining capacity of the buffer memory 220 is the capacity remaining after the first random number sequence is stored.

Modules having various other functions may be included, and detailed embodiments of the disclosure will be described with reference to FIGS. 3 to 10 below.

Figure 3:
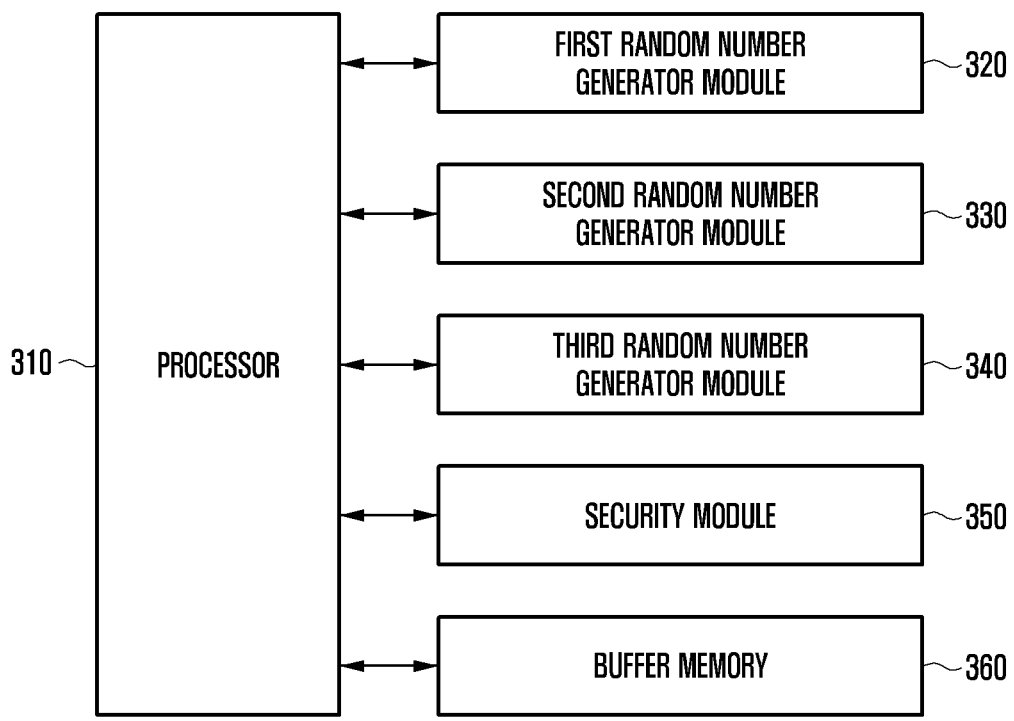
FIG. 3 is a block diagram illustrating an electronic device according to an embodiment.

FIG. 3 is a block diagram illustrating an electronic device according to an embodiment.

Referring to FIG. 3, the electronic device 300 may include a first random number generator module 320, a second random number generator module 330, a third random number generator module 340, a buffer memory 360, and a security module 350. In certain embodiments, some of the illustrated components may be omitted or substituted. The electronic device 300 may further include at least some of the components and/or functions of the electronic device 101 of FIG. 1. At least some of the respective components of the illustrated (or not illustrated) electronic device 300 may be operatively, functionally, and/or electrically connected to each other.

According to an embodiment, the random number generator module may generate a random number to be used to generate a security element of an application, and may include a NDRNG module and a DRNG module. The NDRNG module (hardware random number generator module) may actually use a random source as its input to generate a random number that cannot be predicted in any way, and the DRNG (SW-RNG) module may generate a random number by its own algorithm using given seed information (i.e. pseudo-random). In the DRNG module, when the seed information is the same, the result values may also be the same. In the following detailed description, an example in which the first random number generator module 320 and the second random number generator module 330 are NDRNG modules and the third random number generator module 340 is a DRNG module will be described, but the type of the random number generator module is not limited thereto.

According to an embodiment, the security module 350 may utilize the random number generated by the SW-RNG module, for the security element. The security module 350 may generate an encryption key, may generate essential elements of a cryptographic algorithm such as a nonce and an initial vector, and may use the generated essential elements for encryption and secure communication (e.g., secure socket layers {SSL} or transport layer security {TLS}).

According to an embodiment, the buffer memory 360 is an area for storing the contents of a disk block recently used in a main memory device in order to increase the input/output efficiency of the disk, and may store the random number data generated by the first random number generator module 320 and the second random number generator module 330. The buffer memory 360 may transmit the random number data to a character device node (e.g., the character device node 222 of FIG. 2) using an interface (e.g., an ioctl interface), and the electronic device 300 may obtain an entropy count value based on the size of the random number data stored in the buffer memory 360.

According to an embodiment, a memory (not shown) may include a volatile memory (e.g., the volatile memory 132 of FIG. 1) and a non-volatile memory (e.g., the non-volatile memory 134 of FIG. 1) to temporarily or permanently store various types of data. The memory may include at least some of the components and/or functions of the memory 130 of FIG. 1, and may store the program 140 of FIG. 1.

According to an embodiment, the memory may store various instructions that may be executed by the processor 310. Such instructions may include control commands such as arithmetic and logical operations, data movement, input/output, and the like, which can be recognized by the processor 310.

According to an embodiment, the processor 310 may be a component that can be operatively, functionally, and/or electrically connected to the various components (e.g., the first random number generator module 320, the second random number generator module 330, the third random number generator module 340, the buffer memory 360, and the security module 350) of the electronic device 300 to perform operation or data processing related to control and/or communication of each component. The processor 310 may include at least some of the components and/or functions of the processor 120 of FIG. 1. The processor 310 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

According to an embodiment, there will be no limitations on the arithmetic and data processing functions that the processor 310 can implement on the electronic device 300, but hereinafter, certain embodiments for improving the randomness of the security module 350 by using a plurality of NDRNG modules will be described. Operations of the processor 310 described below may be performed by loading the instructions stored in the memory.

According to an embodiment, the processor 310 may acquire a first random number sequence from the first random number generator module 320 and may store the acquired first random number sequence in the buffer memory 360. The first random number generator module 320 is a NDRNG module that can generate random numbers without relying on seed information obtained externally. According to an embodiment, the first random number generator module 320 may generate a random number through physical processing such as using the current time, input times of the keyboard and the mouse, an interval of the input times, thermal noise, and some photoelectric effect. The buffer memory 360 is a temporary storage device capable of storing random number data generated by the first random number generator module 320 and the second random number generator module 330, and the processor 310 may store the acquired first random number sequence in the buffer memory 360.

According to an embodiment, the processor 310 may determine an entropy count value corresponding to the size of the random number data stored in the buffer memory 360. The entropy count value is a measure of the randomness of the buffer memory 360, and the processor 310 may manage the entropy count value in the form of a variable having a predetermined size (e.g., 4096 bits). The processor 310 may change the entropy count value according to the size of the random number data currently stored in the buffer memory 360. For example, when a random number sequence is input from the random number generator module to the buffer memory 360, the size of the random number data stored in the buffer memory 360 may increase, and thus the processor 310 may increase the entropy count value. Conversely, since the size of the random number data stored in the buffer memory 360 is reduced when the random number data is transmitted from the buffer memory 360 to the character device node and deleted from the buffer memory 360, the processor 310 may decrease the entropy count value.

According to an embodiment, the processor 310 may transmit the random number data stored in the buffer memory 360 to the character device node. According to an embodiment, the character device node may provide a random number corresponding to a size determined by the third random number generator module 340 by its own algorithm as seed information. According to an embodiment, the processor 310 may determine a minimum value of the random number data stored in the character device node. When the size of the random number data stored in the character device node is less than the minimum value, the processor 310 may stop transmitting the random number data to the third random number generator module 340. Thereafter, when the random number data is received from the hardware random number generator module and the size of the random number data stored in the character device node is equal to or greater than the minimum value, the processor 310 may transmit the random number data to the third random number generator module 340.

According to an embodiment, the processor 310 may transmit the random number data from the character device node to the third random number generator module 340. The processor 310 may acquire the size of the random number data required to generate the security element from the security module 350. The processor 310 may acquire the random number data from the character device node by the required amount of the random number data, and may input the acquired random number data to the third random number generator module 340. The third random number generator module may initialize internal state information in order to generate a more secure random number with seed information of a fixed length. The internal state information may improve the randomness of the random number to be used for generating an encryption key while minimizing the generation and injection of the seed information into an internal buffer of the third random number generator module 340. The processor 310 may control the third random number generator module 340 to initialize the internal state information by using the acquired random number data as the seed information, and may generate a third random number sequence. The third random number generator module 340 has its own algorithm, and the processor 310 may select random number data received from the character device node as an input value of the algorithm of the third random number generator module 340. According to an embodiment, the algorithm of the third random number generator module 340 may be a domestic standard encryption algorithm (e.g., NIST SP800-90A). The processor 310 may transmit the obtained third random number sequence to the security module 350.

According to an embodiment, the processor 310 may control the security module 350 to generate an encryption key to be used in an application using the random number. The security module 350 may encrypt data essential for providing various functions of the electronic device 300. For example, the security module 350 may encrypt information such as the user's personal information, location, time, and usage information, and may generate an encryption key, a nonce, and an initial vector for the encrypted information. According to an embodiment, the security module 350 may obtain the size of random number data required to encrypt various types of information. The processor 310 may acquire the size of the random number data required for encryption from the security module 350, and may acquire the random number data corresponding to the corresponding size from the third random number generator module 340.

According to an embodiment, the processor 310 may control a multi-random number generator system service module (e.g., the multi-hardware random number generator system service module 250) to improve the randomness of the terminal, by using the second random number sequence acquired from the second random number generator module 330. Hereinafter, the method in which the processor 310 controls the multi-random number generation system service module and uses the second random number generator module 330 to improve the randomness of the terminal will be described.

According to an embodiment, the processor 310 may acquire the second random number sequence generated by the second random number generator module 330. The second random number generator module 330 is a NDRNG module like the first random number generator module 320, and may generate random numbers based on real physical factors.

According to an embodiment, the processor 310 may change the value of the random number data stored in the buffer memory 360 based on the acquired second random number sequence. For example, the processor 310 may generate a new random number sequence by performing arithmetic operations such as adding or dividing the values of the second random number sequence and the first random number sequence. In this case, the processor 310 may not change the entropy count value. Since the size of the random number data does not increase while the second random number sequence is stored in the buffer memory 360, the entropy count value corresponding to the size of the random number data stored in the buffer memory 360 may be maintained as is.

According to an embodiment, the processor 310 may determine a point in time at which the random number data stored in the buffer memory 360 is changed based on the second random number sequence. The processor 310 may change the random number data by acquiring the second random number sequence when a specific event occurs or at specific time intervals. For example, the processor 310 may change the random number stored in the buffer memory 360 whenever the display of the electronic device 300 is turned on/off, or may change the random number data at given predetermined time periods (e.g., 3 minutes).

According to another embodiment, the processor 310 may improve the randomness of the terminal by storing the acquired second random number sequence in the buffer memory 360. To this end, the processor 310 may acquire an entropy count value corresponding to the maximum capacity of the buffer memory 360 and the size of the random number data stored in the buffer memory 360. The processor 310 may determine the size of random number data to be input to the buffer memory 360, may acquire the second random number sequence from the second random number generator module 330, and may store the acquired second random number sequence in the buffer memory 360. The corresponding embodiment will be described in detail with reference to FIG. 4.

According to an embodiment, the processor 310 may transmit the random number data of the buffer memory 360 in which the first random number sequence and the second random number sequence are stored, to the third random number generator module 340. According to an embodiment, the processor 310 may transmit (first in first out, FIFO) the data stored in the buffer memory 360 to the third random number generator module 340 in the input order, or may transmit the random number data of the buffer memory 360 in a different manner (last in first out, LIFO).

According to another embodiment, the processor 310 may directly input the second random number sequence to the platform instead of inputting the second random number sequence into the buffer memory 360 located at the kernel. Hereinafter, the method in which the processor 310 inputs the second random number sequence to the third random number generator module 340 and the security module 350 to improve the randomness will be described. Operations in which the processor 310 acquires the first random number sequence from the first random number generator module 320 to store the acquired first random number sequence in the buffer memory 360 and the third random number generator module 340 reads seed information corresponding to the amount of random information needed for its algorithm are the same as described above, and thus duplicative descriptions thereof will be omitted.

According to an embodiment, the processor 310 may generate a random number mix function. The processor 310 may generate a third random number sequence based on the first random number sequence generated by the first random number generator module 320 and the second random number sequence generated by the second random number generator module 330 by using the random number mix function. According to an embodiment, the processor 310 may cut a part of the first random number sequence and a part of the second random number sequence to be the same size and may concatenate them. For example, when the length of a random number required for encryption is 4 bits, the random number of 2 bits may be obtained from the first random number sequence, the random number of 2 bits may be obtained from the second random number sequence, and the third random number sequence may be obtained by combining them. According to another embodiment, the processor 310 may generate the third random number sequence by performing a logical operation (e.g., AND, OR, XOR, XNOR, or NAND) on a portion of the first random number sequence and the second random number sequence. For example, when the first random number is expressed in the form of 10011 and the second random number is expressed in the form of 11001, the processor 310 may generate a third random number of 01010 through an XOR operation. The processor 310 may store the random number mix function in the security module 350.

According to an embodiment, the processor 310 may generate a password generate function. The processor 310 may change a given random number into a form for use in a security element in an application by using the password generate function. The processor 310 may store the password generate function in the third random number generator module 340.

According to an embodiment, the processor 310 may acquire random number data from the buffer memory 360 and may transmit the acquired random number data to the third random number generator module 340. The third random number generator module 340 may determine the internal state information based on the random number data, and may generate the third random number sequence by inputting the determined internal state information to the password generate function. The processor 310 may transmit the generated third random number sequence to the security module 350 to generate an encryption key for use in the application.

According to an embodiment, the processor 310 may input the second random number sequence generated by the second random number generator module 330 to the random number mix function. In this case, the processor 310 may mix the randomness of the first random number sequence and the second random number sequence which have been subjected to the password generate function by using the random number mix function. The method in which the random number mix function mixes the randomness of the first random number sequence and the second random number sequence is the same as described above. The processor 310 may generate the encryption key by using the third random number sequence generated by the random number mix function.

According to an embodiment, the processor 310 may input the second random number sequence generated by the second random number generator module 330 to the password generate function. That is, both the internal state information corresponding to the first random number sequence and the second random number sequence may be input to the password generate function as factors. The processor 310 may generate the third random number sequence in the password generate function and may transmit the generated third random number sequence to the security module 350 to generate the encryption key.

According to an embodiment, the processor 310 may generate the encryption key by using the random number mix function in the security module 350 without going through the third random number generator module 340. The processor 310 may directly input the first random number sequence generated by the first random number generator module 320 to the random number mix function without going through the third random number generator module 340, and may mix the first random number sequence with the second random number sequence. The processor 310 may generate the third random number sequence by mixing the randomness of the first random number sequence and the second random number sequence in the security module 350.

Figure 4:
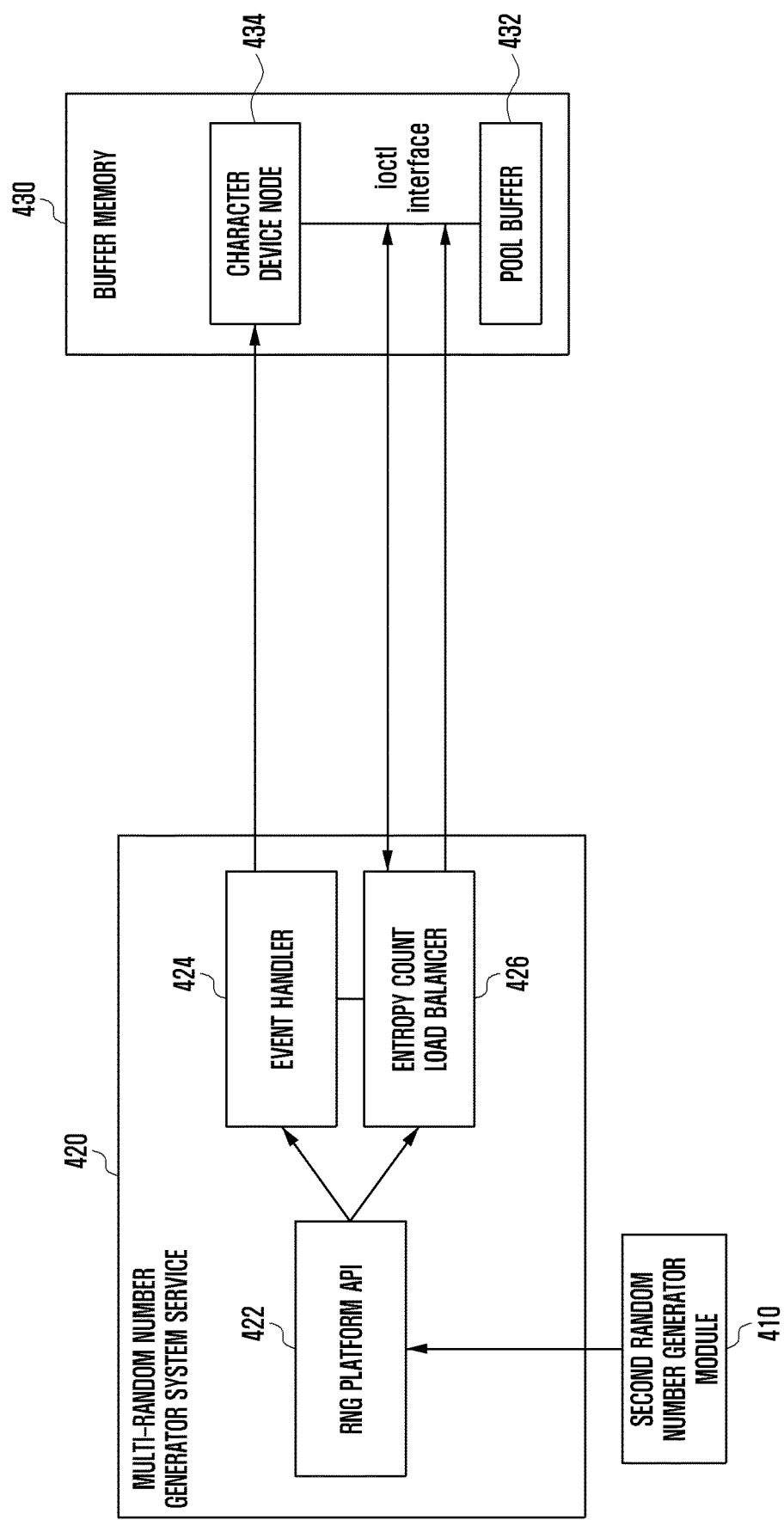
FIG. 4 is a diagram illustrating a configuration for improving randomness of data stored in a buffer memory by using a second random number generator module according to an embodiment.

FIG. 4 is a diagram illustrating a configuration for improving randomness of data stored in a buffer memory by using a second random number generator module according to an embodiment.

Referring to FIG. 4, a multi-random number generator system service module 420 (e.g., the multi-random number generator system service module 250) may include a hardware random number generator (RNG) platform API 422, an event handler module 424, and an entropy count load balancer module 426, and a buffer memory 430 (e.g., the buffer memory 360) may include a character device node 434 (e.g., /dev/random, /dev/urandom) and a pool buffer 432. Hereinafter, the method in which a processor controls the multi-RNG system service module 420 to improve the randomness of the buffer memory 430 with a second random number sequence will be described in detail.

According to an embodiment, the processor may transmit a first random number sequence, which was input to the pool buffer 432, to the character device node 434 using an input/output control interface. Since an application installed on the platform does not have permission for direct access to the pool buffer 432, the application can only access random number data existing in the character device node 434. The processor may transmit random number data stored in the pool buffer 432 to the character device node 434 using the input/output control interface so that a third random number generator module (e.g., the third random number generator module 340) can use the random number data.

According to an embodiment, the processor may acquire a second random number sequence generated by a second random number generator module (e.g., the second random number generator module 330) 410. The second random number generator module 410 is a NDRNG module that can generate a random number by using an external physical phenomenon without relying on seed information. The processor may input the acquired second random number sequence to the buffer memory 430 through the RNG platform API 422.

According to another embodiment, the processor may transmit only the second random number sequence acquired from the second random number generator module to the security module. Unlike the embodiment in which the first random number sequence is provided to the security module through the third random number generator module, the processor may control the second random number generator module to operate independently of the first random number generator module. The processor may transmit the second random number sequence to the security module and may generate an encryption key required by the application based on the second random number sequence.

According to an embodiment, the processor may change the random number data stored in the pool buffer 432 by using the second random number sequence that was input to the buffer memory 430. In this case, the processor may directly write the value of the second random number sequence to the pool buffer 432 through an interface (e.g., /dev/random, /dev/urandom) of the buffer memory. Accordingly, the processor may randomly transform a random number sequence recorded in the pool buffer 432 at a specific point in time based on the randomness of the second random number sequence. At this time, since the processor cannot transmit the measure of the randomness (entropy) of the second random number sequence to the buffer memory 430 through the interface, the buffer memory may maintain the entropy count value as is while improving the randomness of the pool buffer 432.

According to an embodiment, the processor may control the event handler module 424 to input the second random number sequence into the buffer memory 430, thereby determining the point in time at which the random number data is changed. The processor may determine to input the second random number sequence to the buffer memory 430 when a predetermined event occurs or at a predetermined period. For example, the processor may determine to input the second random number sequence into the buffer memory 430 at given first periods (e.g., 3 minutes), and may transmit the second random number sequence acquired from the second random number generator module 410 to the character device node 434 in the buffer memory 430 through the RNG platform API 422. The processor may determine a second random number sequence input period based on the size of the entropy of the random number data required by the security module. Alternatively, the processor may determine to input the second random number sequence into the buffer memory 430 by designating an action repeatedly performed on the electronic device by the user. For example, when the operation of turning on/off the display of the electronic device or the operation of unlocking a home screen is performed by the user, it may be determined to input the second random number sequence into the buffer memory 430. Since the second random number sequence is new random number data for improving the randomness of the buffer memory 430, the processor may determine the corresponding action as an action frequently performed by the user so that an interval between each input time point is not too long.

According to another embodiment, the processor may more efficiently store the second random number sequence in the buffer memory 430 based on information on the entropy count of the buffer memory 430. Hereinafter, the method in which the processor inputs the second random number sequence to the buffer memory 430 to improve the randomness of a terminal will be described.

According to an embodiment, the processor may control the entropy count load balancer module 426 to determine whether to input the second random number sequence to the buffer memory 430 based on the entropy count value of the buffer memory 430. The entropy count value is a measure indicating the randomness of the random number data stored in the buffer memory 430, and may be determined by the processor at predetermined time intervals or when the random number data is input/output.

According to an embodiment, the processor may obtain the required amount of random numbers based on Equations 1 and 2 below. That is, the processor may obtain the entropy count value of the maximum random number data that can be inputted by subtracting the current entropy count value from the maximum capacity of the buffer memory 430. Thereafter, by dividing the entropy count value by the entropy count value per one bit of the random number data generated by the second random number generation module 410, the required amount of random numbers may be obtained. The processor may determine the data size of the second random number sequence to be generated by the second random number generator module 410 based on the obtained required amount of random numbers.

$$H_{DELTA} = 4096 \text{ bits} - H_{Pool} \quad \text{[Equation 1]}$$

$$\text{Length} = H_{DELTA}/H_{HW\text{-}RNG(B)} \quad \text{[Equation 2]}$$

$H_{DELTA}$: Entropy count value of maximum random number data that can be inputted $H_{Pool}$: Current entropy count value of buffer memory Length: Required amount of random number $H_{HW\text{-}RNG(B)}$: Entropy count value per one bit of random number data generated by second random number generator module.

According to an embodiment, the processor may increase the entropy count value by repeatedly applying the calculations of Equations 1 and 2 above. That is, random number data corresponding to the remaining data capacity of the buffer memory 430 may be input at once, or a process of inputting the random number data by recalculating the entropy count value after inputting a part of the remaining data capacity and the remaining capacity of the buffer memory 430 may be repeated.

For example, when the maximum capacity of the buffer memory 430 is 4096 bits, the current entropy count value $H_{Pool}$ is 3072 bits, and the entropy count value $H_{HW\text{-}RNG(B)}$ per one byte of the random number data generated by the second random number generator module 410 is 8 bits, the processor may calculate the entropy count value $H_{DELTA}$ of the maximum random number data that can be inputted as 1024 bits and the required amount Length of the random number as 128 bytes. That is, the processor may acquire the second random number sequence having a size of 128 bytes from the second random number generator module 410, and may input the acquired second random number sequence to the buffer memory 430. The processor may calculate the size of the random number data stored in the buffer memory 430 in response to the acquisition of the second random number sequence, and may increase the entropy count value. Whenever the process in which the processor inputs the second random number sequence data to the buffer memory 430 is repeated, the entropy count value may be increased.

According to an embodiment, the processor may improve the randomness of the random number data stored in the buffer memory 430 by using the above-described method, and may provide the improved randomness to the third random number generator module as the seed information.

Figure 5:
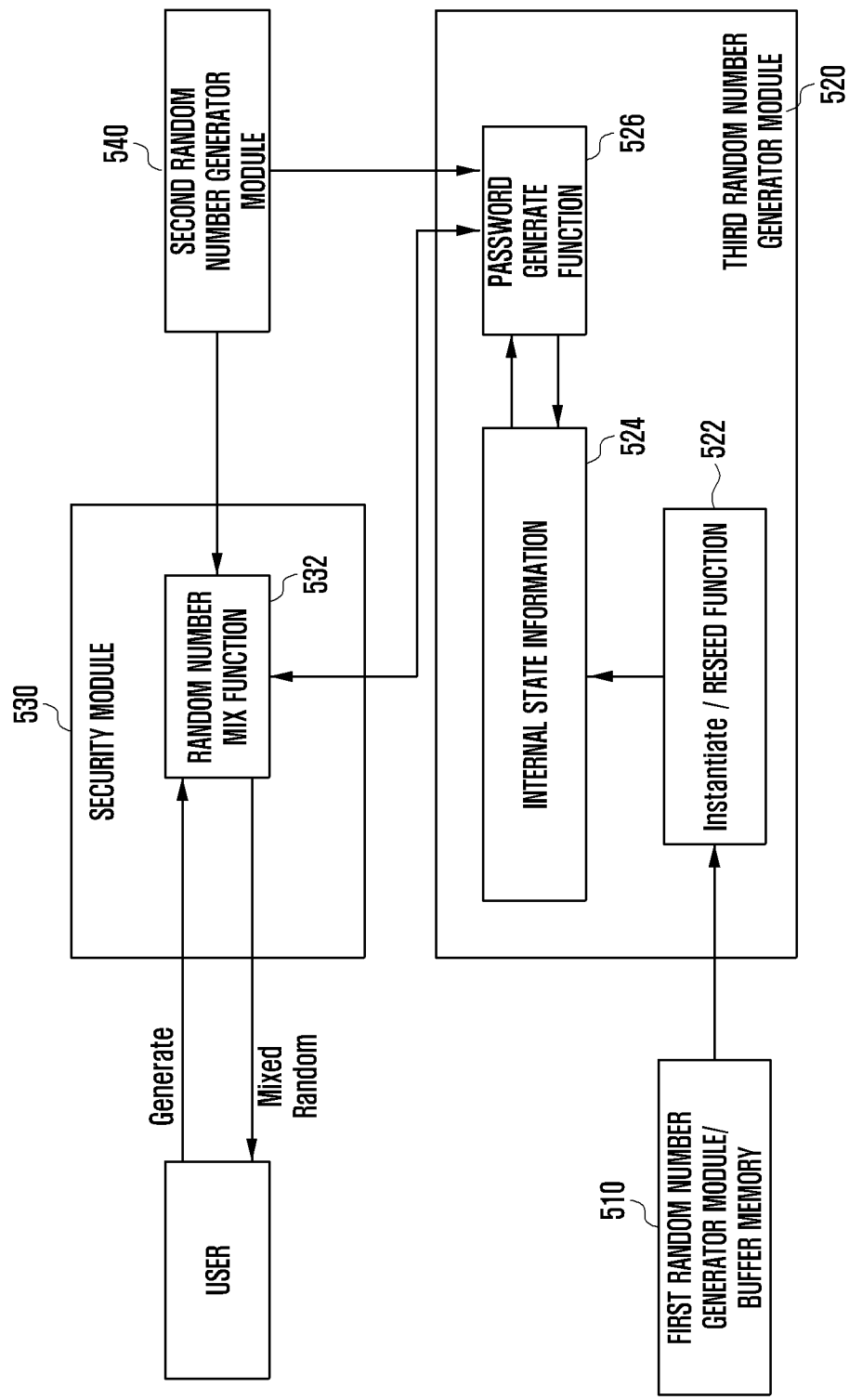
FIG. 5 is a diagram illustrating a configuration for improving randomness by concatenating the randomness of a first random number generator module and a second random number generator module according to an embodiment.

FIG. 5 is a diagram illustrating a configuration for improving randomness by concatenating the randomness of a first random number generator module and a second random number generator module according to an embodiment.

Referring to FIG. 5, a third random number generator module 520 (e.g., the third random number generator module 340) may include a reseed function 522, internal state information 524, and a password generate function 526, and a security module 530 (e.g., the security module 350) may include a random number mix function 532.

According to an embodiment, the processor may generate the password generate function 526, the random number mix function 532, and the reseed function 522. The password generate function 526 is a function that generates a password based on random numbers generated by a first random number generator module (e.g., the first random number generator module 320 of FIG. 3) 510 and a second random number generator module 540 (e.g., the second random number generator module 330), and may be stored in the third random number generator module 520. The random number mix function 532 is a function for generating a third random number sequence by mixing the randomness of the first random number sequence and the second random number sequence, and may be stored in the security module 530. An instantiate function and the reseed function 522 may generate seed information to be used in the third random number generator module 520 based on an encryption algorithm, and may generate the internal state information 524 based on the seed information. When the third random number generator module is first driven, the electronic device may call the instantiate function to generate the first seed information. Thereafter, when the seed information is additionally required, the electronic device may generate the seed information by calling the reseed function 522.

According to an embodiment, the processor may generate the internal state information 524 by inputting random number data stored in a buffer memory 510 (e.g., the buffer memory 360) to the reseed function 522. According to an embodiment, the processor may calculate the size of random number data required to generate an encryption key in the security module 530 using the algorithm of the reseed function 522. The processor may generate the internal state information 524 by acquiring the random number data stored in the buffer memory 510 corresponding to the calculated data size. The internal state information 524 is data reflecting information of the first random number sequence, and the security module 530 may generate an encryption key to be used in an application by using the internal state information 524.

According to an embodiment, the processor may mix the internal state information 524 and the second random number sequence generated by the second random number generator module 540 in the password generate function 526. The processor may additionally input the second random number sequence as a factor of the password generate function 526 in the third random number generator module 520. That is, the third random number sequence may be generated by inputting the first random number sequence and the second random number sequence as factors of the password generate function 526. At this time, the processor may generate a random number after updating the internal state information 524 as an additional input according to the procedure of SP800-90A standard.

According to another embodiment, the processor may generate the third random number sequence by mixing the internal state information 524 and the second random number sequence in the random number mix function 532. The random number mix function 532 may generate the third random number sequence by concatenating two random numbers having the same size or by obtaining half of the length required for random number generation from the two random numbers, respectively, and concatenating them. The processor may generate the third random number sequence through the random number mix function 532 in the security module 530 and may generate an encryption key using the generated third random number sequence.

According to another embodiment, the processor may directly transmit the random number data stored in the buffer memory 510 to the security module 530 without going through the third random number generator module 520. The processor may mix the third random number sequence by inputting the first random number sequence and the second random number sequence to the random number mix function 532 in the security module 530. When the processor does not go through the third random number generator module 520, the electronic device may use a plurality of NDRNG modules to perform calculations more efficiently while maintaining the purpose of improving the randomness of the encryption key.

Figure 6:
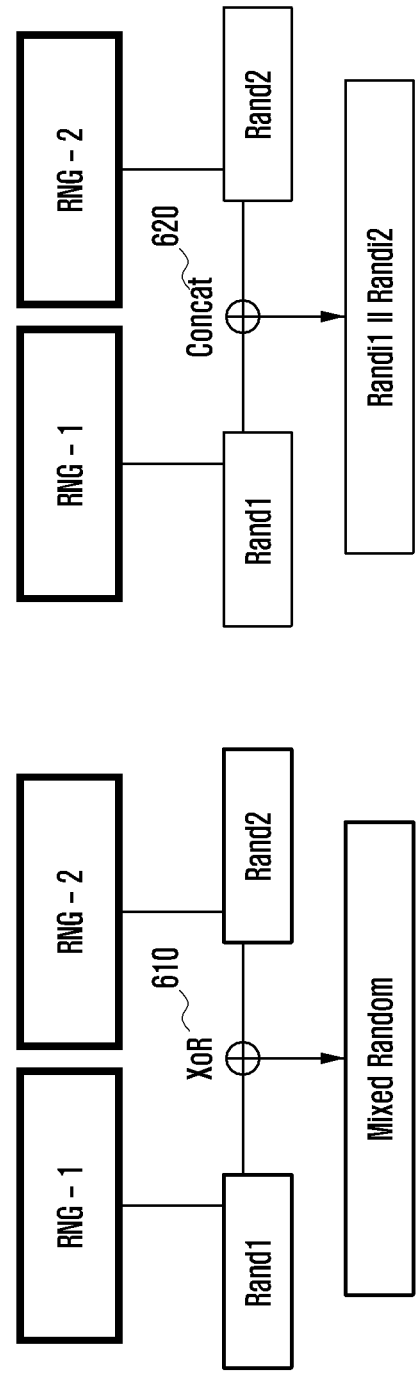
FIG. 6 illustrates an example of a random number mix function according to certain embodiment.

FIG. 6 illustrates an example of a random number mix function according to certain embodiment.

According to an embodiment, the processor may mix a first random number sequence generated by a first random number generator module (e.g., the first random number generator module 320 of FIG. 3) and a second random number sequence generated by a second random number generator module (e.g., the second random number generator module 330) to generate a third random number sequence. The processor may transmit the third random number sequence to a security module (e.g., the security module 350) to generate an encryption key to be used in an application. When there is only one NDRNG module, there is a problem that may be vulnerable to hardware errors, but the problem can be minimized by introducing an additional NDRNG module. Among the embodiments described above with reference to FIG. 3, the embodiment in which the random number generated by the second random number generator module is input to the random number mix function (e.g., the random number mix function 532) stored in the security module and is mixed with the first random number sequence will be described, but the embodiment is not limited thereto. The embodiment can be applied even when the first random number sequence and the second random number sequence are mixed in a password generate function (e.g., the password generate function 526) stored in a third random number generator module (e.g., the third random number generator module 340).

According to an embodiment, the processor may generate the third random number sequence through a logical operation 610 of the first random number sequence and the second random number sequence. The processor may perform the logical operation 610 such as AND, OR, XOR, XNOR, or NAND. For example, when a first random number is 11110, a second random number is 10111, and a NAND operation is performed, the processor may determine a third random number to be 10110. When an XNOR operation is performed, the processor may determine the third random number to be 01001. For AND, OR, and XOR, a new random number may be generated by mixing random numbers generated by two random number generator modules in the same way.

According to another embodiment, the processor may generate a third random number sequence by concatenating in 620 the first random number sequence and the second random number sequence. The processor may generate the third random number sequence by obtaining half of the length of the first random number sequence and half of the length of the second random number sequence and concatenating them. For example, when the first random number is 100111 and the second random number is 011101, a third random number 100101 may be generated by adding the first three digits of the first random number and the last three digits of the second random number.

According to an embodiment, the processor may generate the third random number sequence by mixing the first random number sequence and the second random number sequence in one of the above-mentioned manners, and may transmit the generated third random number sequence to the security module. The security module may generate an encryption key to be used in an application by using the third random number sequence.

An electronic device according to an embodiment may include a first random number generator module, a second random number generator module, a buffer memory configured to store random number data, and a processor configured to be operatively connected to the first random number generator module, the second random number generator module, and the buffer memory, wherein the processor may acquire a first random number sequence from the first random number generator module to store the acquired first random number sequence in the buffer memory, may generate a third random number sequence obtained by changing the first random number sequence based on a second random number sequence acquired from the second random number generator module, and may generate an encryption key based on the third random number sequence.

According to an embodiment, the processor may determine an entropy count value corresponding to a size of entropy of the random number data stored in the buffer memory.

According to an embodiment, the buffer memory may further include a character device node configured to provide the random number data to be utilized by another component in a platform, and the processor may transmit the random number data stored in the buffer memory to the character device node when the entropy count value is greater than or equal to a predetermined value, and may further acquire the first random number sequence from the first random number generator module without transmitting the random number data stored in the buffer memory to the character device node when the entropy count value is less than the predetermined value.

According to an embodiment, the entropy count value may not be changed when the third random number sequence is generated.

According to an embodiment, the processor may calculate a size of entropy of the random number data required to generate the encryption key through a predetermined algorithm, may acquire the random number data corresponding to the calculated size of entropy from the buffer memory, and may initialize internal state information.

According to an embodiment, the processor may determine a time interval for generating the third random number sequence or at least one event for generating the third random number sequence upon occurrence of the at least one event, and may generate the third random number sequence based on the second random number sequence at each time interval or when the at least one event occurs.

According to an embodiment, the processor may generate an essential element of an encryption algorithm such as a nonce and an initial vector by using the third random number sequence.

An electronic device according to an embodiment may include a first random number generator module, a second random number generator module, a buffer memory configured to store random number data, and a processor configured to be operatively connected to the first random number generator module, the second random number generator module, and the buffer memory, wherein the processor may acquire a first random number sequence from the first random number generator module to store the acquired first random number sequence in the buffer memory, may acquire an entropy count value corresponding to the size of entropy of the random number data stored in the buffer memory, may calculate a required amount of random number based on a maximum capacity of the buffer memory and the entropy count value, may acquire a second random number sequence from the second random number generator module based on the required amount of random number and store the acquired second random number sequence in the buffer memory, and may generate an encryption key using the random number data stored in the buffer memory.

According to an embodiment, the processor may increase the entropy count value in response to the acquisition of the second random number sequence.

According to an embodiment, the processor may compare the entropy count value of the buffer memory with the maximum capacity, may further acquire a third random number sequence from the second random number generator module and store the acquired third random number sequence in the buffer memory when the entropy count value is less than the maximum capacity, and may stop the acquisition of the third random number sequence when the entropy count value is equal to the maximum capacity.

An electronic device according to an embodiment may include a first random number generator module, a second random number generator module, and a processor configured to be operatively connected to the first random number generator module and the second random number generator module, wherein the processor may acquire a first random number sequence from the first random number generator module, may acquire a second random number sequence from the second random number generator module, may generate a random number mix function for mixing random number sequences, may generate a third random number sequence by mixing the first random number sequence and the second random number sequence based on the random number mix function, and may generate an encryption key based on the third random number sequence.

According to an embodiment, the electronic device may further include a buffer memory configured to store the first random number sequence, wherein the processor may determine an entropy count value corresponding to the size of entropy of the random number data stored in the buffer memory.

According to an embodiment, the buffer memory may further include a character device node configured to provide the random number data to be utilized by another component in a platform, and the processor may transmit the random number data stored in the buffer memory to the character device node when the entropy count value is greater than or equal to a predetermined value, and may further acquire the first random number sequence from the first random number generator module without transmitting the random number data stored in the buffer memory to the character device node when the entropy count value is less than the predetermined value.

According to an embodiment, the processor may calculate an amount of random number data required to generate the encryption key through a predetermined algorithm, may acquire the random number data corresponding to the calculated amount of random number data from the buffer memory, and may initialize internal state information.

According to an embodiment, the processor may further include a third random number generator module and a security module configured to store the random number mix function.

According to an embodiment, the third random number generator module may be configured with a password generate function, and may be configured to generate internal state information using the random number data.

According to an embodiment, the processor may generate a third random number sequence by inputting a result obtained by inputting the internal state information to the password generate function, to the random number mix function and by inputting the second random number sequence to the random number mix function.

According to an embodiment, the processor may generate the third random number sequence by inputting the internal state information and the second random number sequence to the password generate function.

According to an embodiment, the processor may generate the third random number sequence using a random number mix function that concatenates half of the first random number sequence and half of the second random number sequence.

According to an embodiment, the processor may generate the third random number sequence using a random number mix function that performs a logical operation on the first random number sequence and the second random number sequence.

Figure 7:
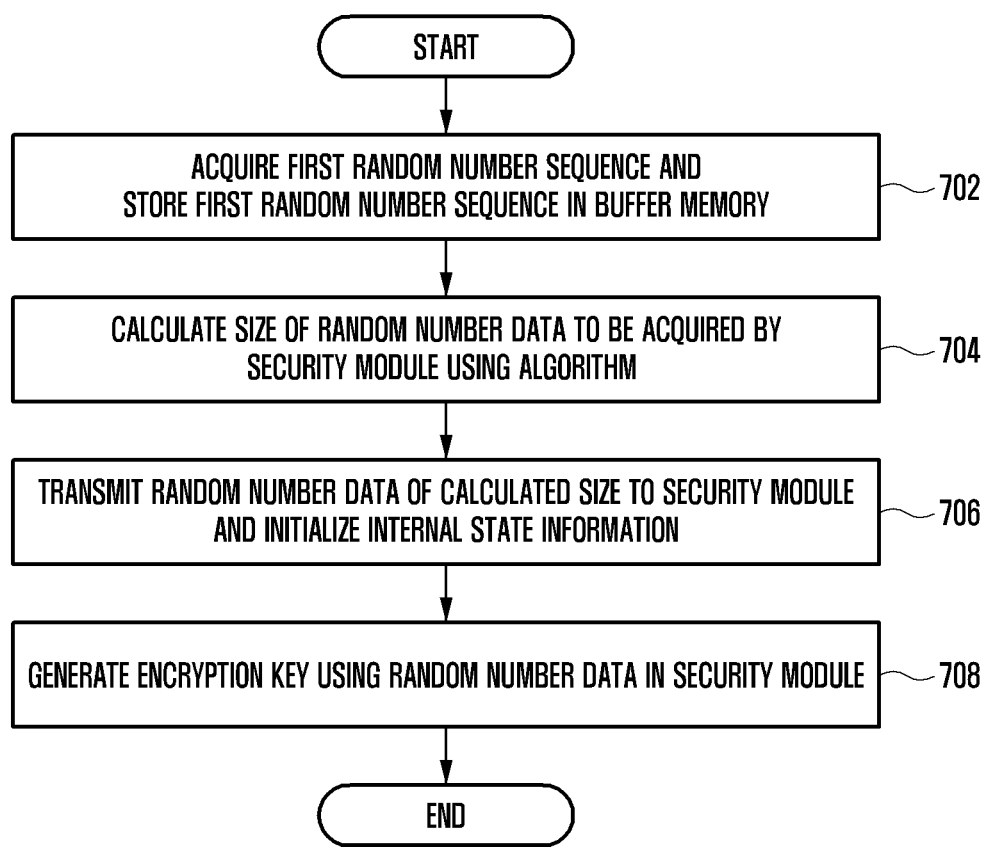
FIG. 7 is a flowchart illustrating a method of generating an encryption key of an electronic device according to an embodiment.

FIG. 7 is a flowchart illustrating a method of generating an encryption key of an electronic device according to an embodiment.

According to an embodiment, in operation 702, the electronic device may acquire a first random number sequence, and may store the acquired first random number sequence in a buffer memory (e.g., the buffer memory 360). According to an embodiment, a first random number generator module (e.g., the first random number generator module 320 of FIG. 3) may be a NDRNG module that that generates a random number based on independent internal state information (e.g., the internal state information 524) without requiring seed information. The first random number generator module may generate a random number through physical processing such as using the current time, input times of the keyboard and the mouse, an interval of the input times, thermal noise, and photoelectric effect. The electronic device may generate a random number by controlling the first random number generator module.

According to an embodiment, in operation 704, the electronic device may calculate the size of random number data to be obtained by a security module (e.g., the security module 350) using its own algorithm. The size of random number data required to generate an encryption key for each security element may be different. The electronic device may acquire the random number data according to the amount of random information required to generate each security element from the buffer memory.

According to an embodiment, the electronic device may determine an entropy count value corresponding to the size of the random number data stored in the buffer memory. The entropy count value is a measure of the randomness of the buffer memory, and the electronic device may manage the entropy count value in the form of a variable having a predetermined size (e.g., 4096 bits). The electronic device may change the entropy count value according to the size of the random number data currently stored in the buffer memory.

According to an embodiment, in operation 706, the electronic device may transmit the random number data of the calculated size to the security module and may initialize the internal state information. The electronic device may transmit the random number data stored in the buffer memory to a character device node (e.g., the character device node 222 of FIG. 2). According to an embodiment, the character device node may provide, as seed information, a random number by a size determined by a third random number generator module (e.g., the third random number generating module 340). According to an embodiment, the electronic device may determine a minimum value of the random number data stored in the character device node. When the size of the random number data stored in the character device node is less than the minimum value, the electronic device may stop transmitting the random number data to the third random number generator module. Thereafter, when the random number data is received from a hardware random number generation module and the size of the random number data stored in the character device node is equal to or greater than the minimum value, the electronic device may transmit the random number data to the third random number generator module.

According to an embodiment, the electronic device may transmit the random number data from the character device node to the third random number generator module. The electronic device may acquire the size of random number data required to generate the security element from the security module. The electronic device may acquire the random number data from the character device node by the required amount of the random number data, and may input the acquired random number data to the third random number generator module. The electronic device may utilize the obtained random number data as seed information and control the third random number generator module to initialize internal state information, and may generate a third random number sequence. According to an embodiment, the third random number generator module has its own algorithm, and the electronic device may select the random number data received from the character device node as an input value for the algorithm of the third random number generator module.

According to an embodiment, in operation 708, the electronic device may generate an encryption key by using the random number data in the security module. The security module may encrypt data essential for providing various functions of the electronic device. According to an embodiment, the security module may calculate the size of random number data required to encrypt various types of information. The electronic device may acquire the size of the random number data required for encryption from the security module, and may acquire the random number data by the corresponding size from the third random number generator module.

According to an embodiment, the electronic device may control a multi-random number generator system service module (e.g., the multi-random number generator system service module 250) to improve the randomness by using a second random number sequence acquired from a second random number generator module (e.g., the second random number generator module 330).

According to an embodiment, the electronic device may acquire the second random number sequence generated by the second random number generator module. The second random number generator module is a NDRNG module such as the first random number generation module, and may generate random numbers based on real physical elements.

According to an embodiment, the electronic device may change the value of the random number data stored in the buffer memory based on the acquired second random number sequence. In this case, the electronic device may not change the entropy count value. Since the entropy of the second random number data is not input while the second random number sequence is stored in the buffer memory, the entropy count value corresponding to the size of the random number data stored in the buffer memory may be maintained as is.

According to an embodiment, the electronic device may determine a point in time at which the random number data stored in the buffer memory is changed based on the second random number sequence. The electronic device may change the random number data by acquiring the second random number sequence when a specific event occurs or at given predetermined time periods.

According to another embodiment, the electronic device may improve the randomness by storing the acquired second random number sequence in the buffer memory. To this end, the electronic device may acquire an entropy count value corresponding to the maximum capacity of the buffer memory and the size of the random number data stored in the buffer memory. The electronic device may determine the size of random number data to be input to the buffer memory, may acquire the second random number sequence from the second random number generator module, and may input the acquired second random number sequence to the buffer memory. The electronic device may transmit the random number data of the buffer memory in which the first random number sequence and the second random number sequence are stored, to the third random number generator module.

According to another embodiment, the electronic device may directly input the second random number sequence to the platform instead of inputting the second random number sequence into the buffer memory located at the kernel. The electronic device may generate a random number mix function (e.g., the random number mix function 532). The electronic device may concatenate the first random number sequence generated by the first random number generator module and the second random number sequence generated by the second random number generator module by using the random number mix function. According to an embodiment, the electronic device may cut a part of the first random number sequence and a part of the second random number sequence by the same size and may concatenate them. The electronic device may store the random number mix function in the security module.

According to an embodiment, the electronic device may generate a password generate function (e.g., the password generation function 526). The electronic device may change a given random number into a form to be used for the security element on the application by using the password generate function. The electronic device may store the password generate function in the third random number generator module.

According to an embodiment, the electronic device may acquire the random number data from the buffer memory and may transmit the acquired random number data to the third random number generator module. The third random number generator module may determine the internal state information based on the random number data, and may generate the third random number sequence by inputting the internal state information to the password generate function. The electronic device may transmit the generated third random number sequence to the security module to generate the encryption key for use on the application.

According to an embodiment, the electronic device may input the second random number sequence generated by the second random number generator module to the random number mix function. In this case, the electronic device may use the random number mix function to mix the randomness of data of the first random number sequence and the randomness of the second random number sequence, which have been subjected to the password generate function. The method in which the random number mix function mixes the randomness of the first random number sequence and the second random number sequence is the same as described above. The electronic device may generate the encryption key by using the third random number sequence generated by the random number mix function.

According to an embodiment, the electronic device may input the second random number sequence generated by the second random number generator module to the password generate function. That is, both the internal state information corresponding to the first random number sequence and the second random number sequence may be input to the password generate function as factors. The electronic device may generate the third random number sequence in the password generate function and may transmit the generated third random number sequence to the security module to generate the encryption key.

According to an embodiment, the electronic device may generate the encryption key by using the random number mix function in the security module without going through the third random number generator module. The electronic device may directly input the first random number sequence generated by the first random number generator module to the random number mix function without going through the third random number generator module, and may mix the first random number sequence with the second random number sequence. The electronic device may generate the third random number sequence by mixing the randomness of the first random number sequence and the second random number sequence in the security module.

Figure 8:
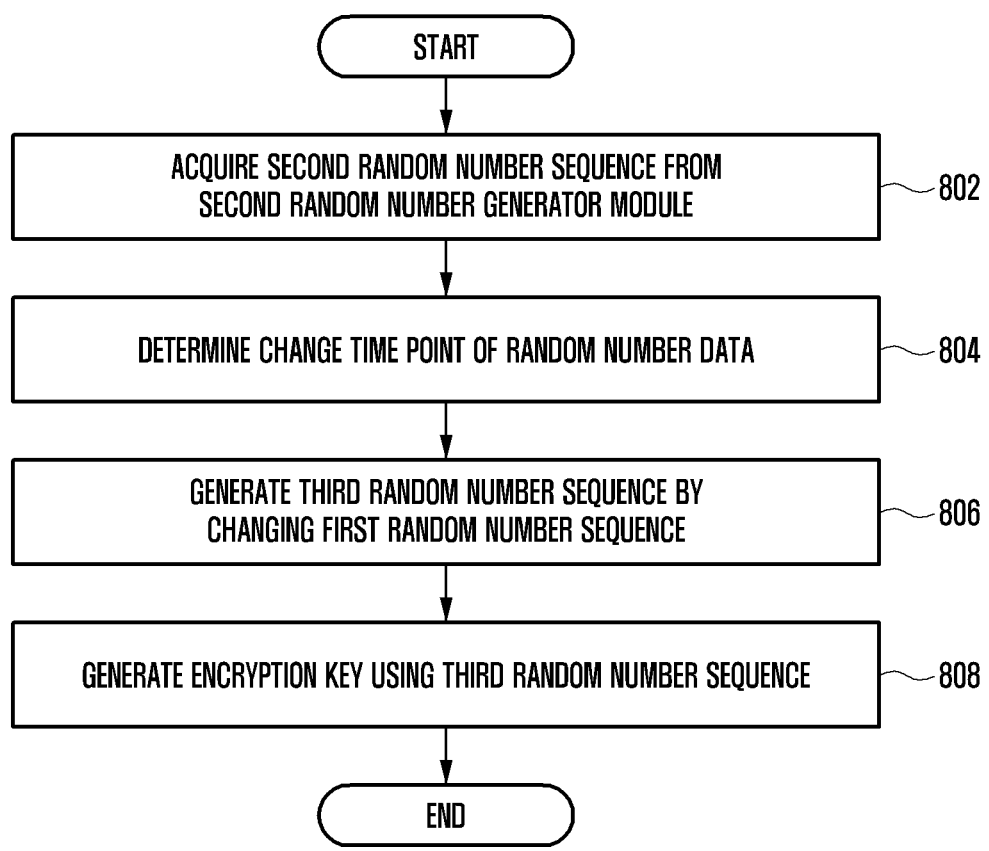
FIG. 8 is a flowchart illustrating a method of changing a first random number sequence using a second random number generator module of an electronic device according to an embodiment.

FIG. 8 is a flowchart illustrating a method of changing a first random number sequence using a second random number generator module of an electronic device according to an embodiment.

According to an embodiment, in operation 802, the electronic device may acquire a second random number sequence from a second random number generator module (e.g., the second random number generator module 330). The second random number generator module is a NDRNG module that can generate a random number by using external physical phenomenon without relying on seed information. The electronic device may change random number data stored in a buffer memory (e.g., the buffer memory 360) based on the second random number sequence.

According to an embodiment, in operation 804, the electronic device may determine a point in time at which the random number data is changed. The electronic device may determine to input the second random number sequence to the buffer memory when a predetermined event occurs or at a predetermined period. Since the second random number sequence is new random number data for improving the randomness of the buffer memory, the electronic device may determine an action frequently performed by the user as the action for changing the random number data so that an interval between each input time point is not too long.

According to an embodiment, in operation 806, the electronic device may generate a third random number sequence by changing the first random number sequence. In this case, since the electronic device uses the second random number sequence only to change the random number data previously stored in the buffer memory instead of storing the second random number sequence in the buffer memory, an entropy count value may not be changed. The electronic device may improve the randomness of the random number data by using the second random number sequence without changing the entropy count value.

According to an embodiment, in operation 808, the electronic device may generate an encryption key using the third random number sequence.

Figure 9:
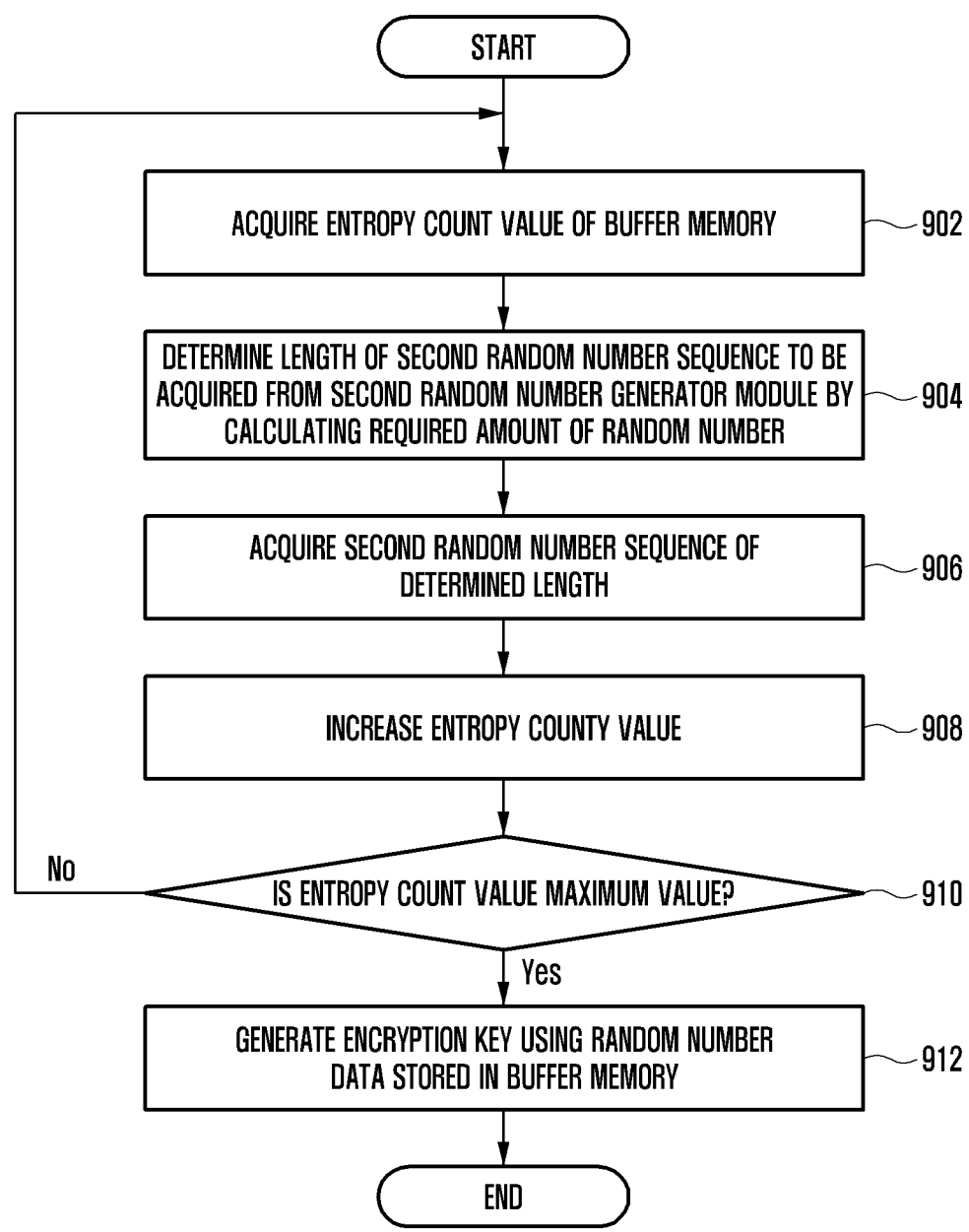
FIG. 9 is a flowchart illustrating a method for increasing an entropy count value of a buffer memory by acquiring a second random number sequence of an electronic device according to an embodiment.

FIG. 9 is a flowchart illustrating a method for increasing an entropy count value of a buffer memory by acquiring a second random number sequence of an electronic device according to an embodiment.

According to an embodiment, in operation 902, the electronic device may acquire an entropy count value of a buffer memory (e.g., the buffer memory 360). The entropy count value is a measure representing the randomness of random number data stored in the buffer memory, and may be determined by the electronic device at certain time intervals or when random number data is input/output.

According to an embodiment, in operation 904, the electronic device may calculate the required amount of random number of the buffer memory. The electronic device may calculate the entropy count value of the maximum random number data that can be inputted by subtracting the current entropy count value from the maximum capacity of the buffer memory. Next, by dividing the entropy count value by the entropy count value per one bit of the random number data generated by the second random number generator module (e.g., the second random number generation module 330), the required amount of random number may be calculated. The electronic device may determine the length of the second random number sequence to be acquired from the second random number generator module based on the calculated required amount of random number.

According to an embodiment, in operation 906, the electronic device may acquire the second random number sequence of the determined length. According to an embodiment, the electronic device may acquire data of the determined length at once, or may acquire only a part of the determined length at a given time.

According to an embodiment, in operation 908, the electronic device may increase the entropy count value of the buffer memory. Since the entropy count value corresponds to the size of the random number data stored in the buffer memory, the electronic device may increase the entropy count value by the amount of the random number data that was additionally inputted into the buffer memory.

According to an embodiment, in operation 910, the electronic device may determine whether the entropy count value is the maximum value. The electronic device may determine whether to input the second random number sequence into the buffer memory based on the entropy count value of the buffer memory. The electronic device may determine the data size of the second random number sequence to be generated by the second random number generator module based on the calculated required amount of random number.

According to an embodiment, the electronic device may increase the entropy count value by repeatedly applying the calculations of Equations 1 and 2 above. That is, random number data corresponding to the remaining data capacity of the buffer memory may be input at once, or a process of inputting the random number data by recalculating the entropy count value after inputting a part of the remaining data capacity and the remaining capacity of the buffer memory may be repeated. The electronic device may calculate the size of the random number data stored in the buffer memory in response to the acquisition of the second random number sequence, and may increase the entropy count value. Whenever the process in which the electronic device inputs the second random number sequence data to the buffer memory is repeated, the entropy count value may be increased.

According to an embodiment, in operation 912, the electronic device may generate an encryption key using the random number data stored in the buffer memory. The electronic device may improve the randomness of the random number data stored in the buffer memory by using the above-described method, and may provide the improved randomness which can be utilized as seed information in a third random number generator module (e.g., the third random number generator module 340).

Figure 10:
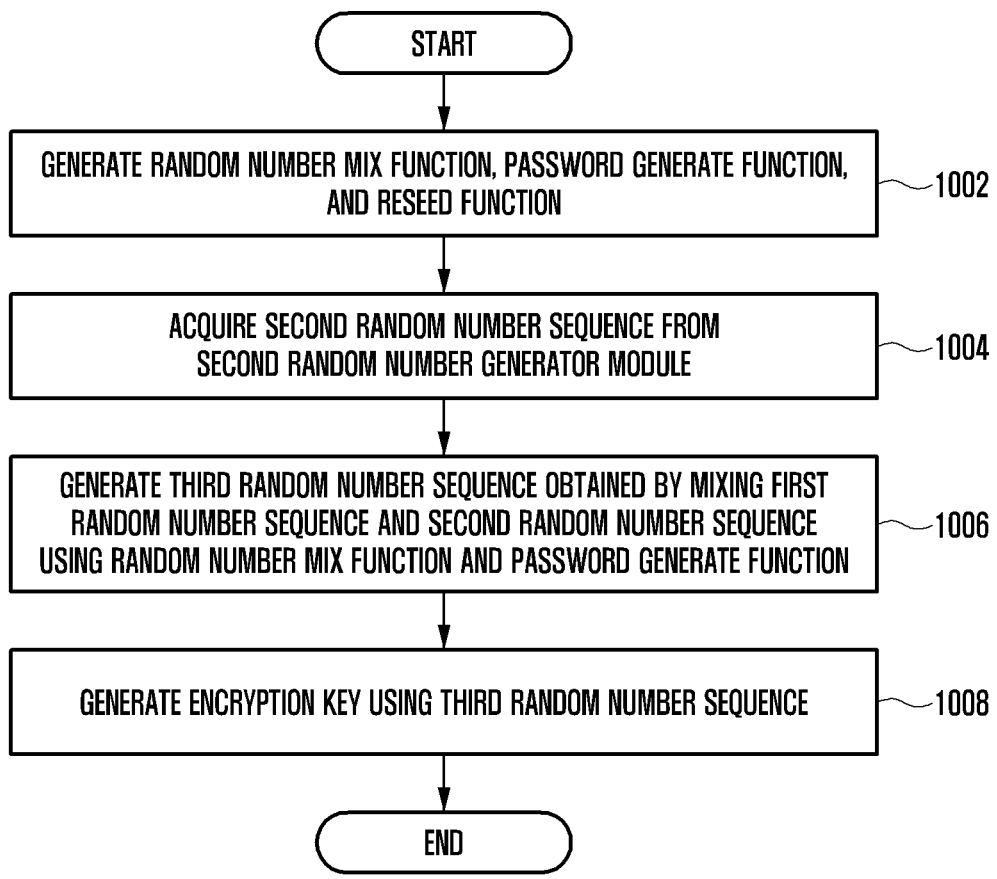
FIG. 10 is a flowchart illustrating a method for generating a third random number sequence using a random number mix function according to an embodiment.

FIG. 10 is a flowchart illustrating a method for generating a third random number sequence using a random number mix function according to an embodiment.

According to an embodiment, in operation 1002, the electronic device may generate a random number mix function (e.g., the random number mix function 532) and a password generate function (e.g., the password generate function 526). The password generate function is a function that generates a password based on random numbers generated by a first random number generator module (e.g., the first random number generator module 320 of FIG. 3) and a second random number generator module (e.g., the second random number generator module 330), and may be stored in a third random number generator module (e.g., the third random number generator module 340). The random number mix function is a function that generates a third random number sequence by mixing a first random number sequence and a second random number sequence, and may be stored in a security module (e.g., the security module 350). An instantiate function and a reseed function may generate seed information to be used in the third random number generator module based on an encryption algorithm and may generate internal state information (e.g., the internal state information 524) based on the seed information. The Instantiate function and the reseed function may be functions included in the SP800-90A DRBG algorithm standard. Specifically, when the third random number generator module 340 is first driven, the electronic device may call the instantiate function to generate first seed information. Thereafter, when the seed information is additionally required, the electronic device may generate the seed information by calling the reseed function.

According to an embodiment, the electronic device may generate the internal state information by inputting random number data stored in a buffer memory (e.g., the buffer memory 360) to the instantiate function and the reseed function. According to an embodiment, the electronic device may calculate the size of random number data required to generate an encryption key in the security module by using an algorithm of the instantiate function and the reseed function. The electronic device may generate the internal state information by acquiring the random number data stored in the buffer memory by the calculated data size. The internal state information is data reflecting information of the first random number sequence, and the security module may generate an encryption key to be used for an application by utilizing the internal state information.

According to an embodiment, in operation 1004, the electronic device may acquire the second random number sequence from the second random number generator module.

According to an embodiment, in operation 1006, the electronic device may generate a third random number sequence obtained by mixing the first random number sequence and the second random number sequence using the random number mix function and the password generate function. In the random number mix function, the third random number sequence may be generated by concatenating two random numbers having the same size or by obtaining half of the length required for generating the two random numbers, respectively, and then concatenating them. The electronic device may generate the third random number sequence through the random number mix function in the security module, and may generate an encryption key using the generated third random number sequence.

According to another embodiment, the electronic device may mix the internal state information and the second random number sequence generated by the second random number generator module in the password generate function. The electronic device may additionally input the second random number sequence as a factor of the password generate function in the third random number generator module. That is, the third random number sequence may be generated by inputting the first random number sequence and the second random number sequence as the factors of the password generate function.

According to another embodiment, the electronic device may directly transmit the random number data stored in the buffer memory to the security module without going through the third random number generator module. The electronic device may mix the third random number sequence by inputting the first random number sequence and the second random number sequence to the random number mix function in the security module.

According to an embodiment, in operation 1008, the electronic device may generate an encryption key using the third random number sequence. The electronic device may control the security module to generate the encryption key to be used in an application.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

The invention claimed is:

1. An electronic device comprising:
a first random number generator circuitry;
a second random number generator circuitry;
a buffer memory including a character device node;
one or more processors; and
memory storing instructions that, when executed by the one or more processors, cause the electronic device to:
control the first random number generator circuitry to obtain a first non-deterministic random number sequence,
determine an entropy count value corresponding to a size of entropy of the first non-deterministic random number sequence,
in accordance with the entropy count value being greater than or equal to a predetermined value, transmit the first non-deterministic random number sequence to the character device node,
control the second random number generator circuitry to obtain a second non-deterministic random number sequence,
generate a third random number sequence by changing the first non-deterministic random number sequence stored in the character device node based on the second non-deterministic random number sequence, and
generate an encryption key based on the third random number sequence.

2. The electronic device of claim 1, wherein the instructions, when executed by the one or more processors, cause the electronic device to, in accordance with the entropy count value being less than to the predetermined value;
control the first random number generator circuitry to obtain a fourth non-deterministic random number sequence, and
repeat the determining of an entropy count value corresponding to a size of entropy of the fourth non-deterministic random number sequence.

3. The electronic device of claim 1, wherein the entropy count value is maintained when the third random number sequence is generated.

4. The electronic device of claim 1, wherein the instructions, when executed by the one or more processors, further cause the electronic device to:
calculate a size of entropy of random number data required to generate the encryption key through a predetermined algorithm,
acquire the random number data corresponding to the calculated size of entropy from the memory, and
initialize internal state information.

5. The electronic device of claim 1, wherein the instructions, when executed by the one or more processors, further cause the electronic device to:
determine a time interval for generating the third random number sequence or at least one event for generating the third random number sequence upon occurrence of the at least one event, and
generate the third random number sequence based on the second non-deterministic random number sequence at each time interval or when the at least one event occurs.

6. The electronic device of claim 1, wherein the instructions, when executed by the one or more processors, further cause the electronic device to generate an essential element of an encryption algorithm using the third random number sequence, wherein the essential element includes a nonce and/or an initial vector.

7. An electronic device comprising:
a first random number generator circuitry;
a second random number generator circuitry;
one or more processors; and
memory storing instructions that, when executed by the one or more processors, cause the electronic device to:
acquire a first random number sequence from the first random number generator circuitry to store the acquired first random number sequence in the memory,
acquire an entropy count value corresponding to a size of entropy of random number data stored in the memory,
calculate a required amount of random number based on a maximum capacity of the memory and the entropy count value,
acquire a second random number sequence from the second random number generator circuitry based on the required amount of random number and store the acquired second random number sequence in the memory,
generate an encryption key using the random number data stored in the memory,
increase the entropy count value in response to acquisition of the second random number sequence, and
compare the entropy count value of the memory with the maximum capacity.

8. An electronic device comprising:
a first random number generator circuitry;
a second random number generator circuitry;
one or more processors; and
memory storing instructions that, when executed by the one or more processors, cause the electronic device to:
acquire a first random number sequence from the first random number generator circuitry,
acquire a second random number sequence from the second random number generator circuitry,
generate a random number mix function for mixing random number sequences,
generate a third random number sequence by mixing the first random number sequence and the second random number sequence based on the random number mix function,
generate an encryption key based on the third random number sequence,
determine an entropy count value corresponding to a size of entropy of random number data stored in the memory, and
include a third random number generator circuitry and a security circuitry configured to store the random number mix function,
wherein the third random number generator circuitry is configured with a password generate function, and is configured to generate internal state information using the random number data.

9. The electronic device of claim 8, wherein:
the memory further includes a character device node configured to provide the random number data to be utilized by another component in a platform, and
the one or more processors are configured to:
transmit the random number data stored in the memory to the character device node when the entropy count value is greater than or equal to a predetermined value, and
further acquire the first random number sequence from the first random number generator circuitry without transmitting the random number data stored in the memory to the character device node when the entropy count value is less than the predetermined value.

10. The electronic device of claim 8, wherein the one or more processors is configured to:
   calculate an amount of the random number data required to generate the encryption key through a predetermined algorithm,
   acquire the random number data corresponding to the calculated amount of random number data from the memory, and
   initialize the internal state information.

11. The electronic device of claim 8, wherein the one or more processors is configured to:
   input a result obtained by inputting the internal state information to the password generate function, to the random number mix function, and
   input the second random number sequence to the random number mix function to generate the third random number sequence.

12. The electronic device of claim 8, wherein the one or more processors is configured to:
   generate the third random number sequence by inputting the internal state information and the second random number sequence to the password generate function.

13. The electronic device of claim 8, wherein the one or more processors is configured to generate the third random number sequence using a random number mix function that concatenates half of the first random number sequence and half of the second random number sequence.

14. The electronic device of claim 8, wherein the one or more processors is configured to generate the third random number sequence using a random number mix function that performs a logical operation on the first random number sequence and the second random number sequence.

* * * * *